(12) United States Patent
Eberhardt

(10) Patent No.: US 7,900,876 B2
(45) Date of Patent: Mar. 8, 2011

(54) WINGTIP FEATHERS, INCLUDING FORWARD SWEPT FEATHERS, AND ASSOCIATED AIRCRAFT SYSTEMS AND METHODS

(75) Inventor: Scott Eberhardt, Seattle, WA (US)

(73) Assignee: The Boeing Company, Chicago, IL (US)

( * ) Notice: Subject to any disclaimer, the term of this patent is extended or adjusted under 35 U.S.C. 154(b) by 877 days.

(21) Appl. No.: 11/836,414

(22) Filed: Aug. 9, 2007

(65) Prior Publication Data
US 2009/0039204 A1 Feb. 12, 2009

(51) Int. Cl.
*B64C 23/06* (2006.01)
*B64C 5/08* (2006.01)

(52) U.S. Cl. .................................................... 244/199.4

(58) Field of Classification Search ............... 244/199.4, 244/130, 124, 199.3, 200.1, 45 R, 47, 48, 244/35 R
See application file for complete search history.

(56) References Cited

U.S. PATENT DOCUMENTS

| | | |
|---|---|---|
| 1,466,551 A | 8/1923 | Thurston |
| 1,841,921 A | 1/1932 | Spiegel |
| 1,888,418 A | 11/1932 | Adams |
| 2,576,981 A | 12/1951 | Vogt |
| 2,743,888 A | 5/1956 | Lippisch |
| 3,027,118 A | 3/1962 | Willox |
| 3,270,988 A | 9/1966 | Cone, Jr. |
| 3,712,564 A | 1/1973 | Rethorst |
| 3,840,199 A | 10/1974 | Tibbs |
| 4,045,336 A | 8/1977 | Isteri |
| 4,046,336 A | 9/1977 | Tangler |
| 4,172,574 A | 10/1979 | Spillman |
| 4,190,219 A | 2/1980 | Hackett |
| 4,205,810 A | 6/1980 | Ishimitsu |
| 4,382,569 A | 5/1983 | Boppe et al. |
| 4,455,004 A | 6/1984 | Whitaker, Sr. |
| 4,457,479 A | 7/1984 | Daude |
| 4,541,593 A | 9/1985 | Cabrol |
| 4,545,552 A | 10/1985 | Welles |
| 4,569,494 A * | 2/1986 | Sakata ...................... 244/199.1 |

(Continued)

FOREIGN PATENT DOCUMENTS

DE 2149956 4/1973

(Continued)

OTHER PUBLICATIONS

Whitcomb, Richard T., "A Design Approach and Seleted Wind-Tunnel Results at High Subsonic Speeds for Wing-Tip Mounted Winglets," NASA TN D82-60, Jul. 1976, 31 pages.

(Continued)

*Primary Examiner* — Tien Dinh
(74) *Attorney, Agent, or Firm* — Perkins Coie LLP

(57) ABSTRACT

Tip feathers, including forward swept tip feathers, and associated aircraft systems and methods are disclosed. A system in accordance with one embodiment includes an aircraft wing having an inboard portion, an outboard portion, and a leading edge having an aft wing sweep angle at the outboard portion. A first feather is fixed relative to, and projects outwardly from, the outboard portion of the wing and has a leading edge with a first, forward sweep angle relative to a pitch axis of the wing. A second feather is fixed relative to, and projects outwardly from, the outboard portion of the wing at least partially aft of the first feather, and has a leading edge with a second, aft sweep angle relative to the pitch axis.

13 Claims, 3 Drawing Sheets

U.S. PATENT DOCUMENTS

| | | | |
|---|---|---|---|
| 4,595,160 | A | 6/1986 | Santos |
| 4,671,473 | A | 6/1987 | Goodson |
| 4,674,709 | A | 6/1987 | Welles |
| 4,700,911 | A | 10/1987 | Zimmer |
| 4,714,215 | A | 12/1987 | Jupp et al. |
| 4,722,499 | A | 2/1988 | Klug |
| 4,776,542 | A | 10/1988 | Van Dam |
| 5,039,032 | A | 8/1991 | Rudolph |
| 5,082,204 | A | 1/1992 | Croston |
| 5,088,661 | A * | 2/1992 | Whitener .............. 244/76 R |
| 5,102,068 | A | 4/1992 | Gratzer |
| 5,156,358 | A | 10/1992 | Gerhardt |
| 5,275,358 | A | 1/1994 | Goldhammer et al. |
| 5,348,253 | A | 9/1994 | Gratzer |
| 5,407,153 | A | 4/1995 | Kirk et al. |
| 5,634,613 | A | 6/1997 | McCarthy |
| 5,788,191 | A | 8/1998 | Wake et al. |
| 5,909,858 | A | 6/1999 | Hawley |
| 5,975,464 | A | 11/1999 | Rutan |
| 5,992,793 | A | 11/1999 | Perry et al. |
| 6,089,502 | A | 7/2000 | Herrick et al. |
| 6,161,797 | A | 12/2000 | Kirk et al. |
| 6,237,873 | B1 | 5/2001 | Amaoka et al. |
| 6,345,790 | B1 | 2/2002 | Brix |
| 6,484,968 | B2 | 11/2002 | Felker |
| 6,547,181 | B1 | 4/2003 | Hoisington et al. |
| 6,578,798 | B1 * | 6/2003 | Dizdarevic et al. ........ 244/199.1 |
| 6,726,149 | B2 | 4/2004 | Wojciechowski |
| 6,827,314 | B2 | 12/2004 | Barriety |
| 6,886,778 | B2 | 5/2005 | McLean |
| 7,048,228 | B2 | 5/2006 | Vassberg et al. |
| 7,275,722 | B2 | 10/2007 | Irving et al. |
| 2004/0155146 | A1 | 8/2004 | Wyrembek et al. |
| 2005/0184196 | A1 | 8/2005 | Shmilovich et al. |
| 2006/0027703 | A1 | 2/2006 | Bussom et al. |
| 2007/0018049 | A1 | 1/2007 | Stuhr |
| 2008/0191099 | A1 | 8/2008 | Werthmann et al. |
| 2009/0084904 | A1 | 4/2009 | Detert |
| 2009/0224107 | A1 | 9/2009 | Mclean |
| 2009/0256029 | A1 | 10/2009 | Malachowski et al. |

FOREIGN PATENT DOCUMENTS

| | | |
|---|---|---|
| DE | 19926832 A1 | 1/2001 |
| EP | 094064 A1 | 11/1983 |
| EP | 0113466 A1 | 7/1984 |
| EP | 1493660 | 1/2005 |
| FR | 2780700 A1 | 1/2000 |

OTHER PUBLICATIONS

Aero 17; Wingtip Devices http://www.boeing.com/commercial/aeromagazine/aero_17/wingtip_devices.html; accessed Jun. 1, 2004 5 pgs.

Cone, "The Theory of Induced Lift and Minimum Induced Drag of Non-Planar Lifting Systems" NASA Technical Report R-139 National Aeronautics and Space Administration, Issued Aug. 16, 1963, 35 pages.

Craig et al., "Spanload Optimization for Strength Designed Lifting Surfaces," AIAA 6th Applied Aerodynamics Conference, The Boeing Company, Jul. 6-8, 1988, 8 pages.

Design and Analysis of Winglets for Military Aircraft. Technical Report AFFDL-TR-76-3. Feb. 1976 (pp. 88/143).

International Search Report and Written Opinion, International Patent Application No. PCT/US2008/071954, Applicant: The Boeing Company, mailed Aug. 13, 2009, 13 pages.

Kroo, I., "NonPlanar Wing Concepts for Increased Aircraft Efficiency," VKI lecture series on Innovative Configurations and Advanced Concepts for Future Civil Aircraft, Jun. 6-10, 2005, 29 pages.

La Roche et al., "Wing-Grid, a Novel Device for Reduction of Induced Drag on Wings," La Roche Consulting presented at ICAS 96 in Sorrento, Italy, 7 pages.

McLean, Doug "Wingtip Devices: What They Do and How They Do It," Boeing Aerodynamics, Article 4, presented 2005 Boeing Performance and Flight Operations Engineering Conference, 20 pages.

Pfenninger et al., "About the Design Philophy of Long Range LFC Transports with Advanced Supercritical LFC Airfoils," AIAA 19th Fluid Dynamics, Plasma Dynamics and Laser Conference, AIAA 87, Jun. 8-10, 1987, 66 pages.

Wilcox et al. Stimultaneous Optimization of a Multiple-Aircraft Family: Journal of Aircraft, Jul. 2003, pp. 616-622.

Wing Design Parameters (4 pages) http://www.desktopaero.com/appliedaero/wingdesign/wingparams.html [Accessed Jun. 12, 2003].

\* cited by examiner

WINGTIP FEATHERS, INCLUDING FORWARD SWEPT FEATHERS, AND ASSOCIATED AIRCRAFT SYSTEMS AND METHODS

TECHNICAL FIELD

Aspects of the present disclosure are directed to wingtip feathers, including forward swept feathers, and associated aircraft systems and methods.

BACKGROUND

A significant amount of design and manufacturing effort goes into the shape and configuration of the wings used for commercial transport aircraft. The wings must meet a myriad of design goals, including producing high lift with low drag, and providing sufficient structure to carry a payload, without contributing unnecessarily to aircraft weight. To meet these often contradictory design requirements, designers have developed a number of techniques for distributing the load over the span of the wing in a manner that produces sufficient lift without requiring unnecessary structure. For example, the "ideal" load distribution for a flat wing is generally elliptical. However, conventional aircraft wings are typically not designed with elliptical span loads. Instead, they are designed with compromised "triangular" span loads that reduce structural bending loads at the root of the wing. Such designs trade a slight increase in induced drag for a reduction in airframe weight. The degree of compromise varies considerably from one aircraft to another.

To produce such a triangular span load, the wing tip is typically twisted to produce "washout." Washout refers to a wing tip that is twisted so that the leading edge moves downward and the trailing edge moves upward relative to the orientations of these components at the wing root. Washing out the wing tip in this manner lowers the angle of attack of the wing tip with respect to the wing root, thereby reducing the lift distribution toward the wing tip. This arrangement also prevents the entire wing from stalling all at once at high angles of attack. Instead, the wing root tends to stall first and the wing tip tends to stall last because it is at an effectively lower angle of attack.

To recapture some of the wing loading lost by washing out the wing tip, aircraft manufacturers have added wing tip devices to the outboard regions of the wings. For example, FIG. 1 illustrates a Boeing 747 aircraft 10 having winglets 21 mounted at the tips of the wings 20. The winglets 21 can delay the gradual spanwise reduction in lift toward the tip of the wing 20, thereby increasing the overall lift of the wing 20 without increasing the wing span. While such devices have proven effective in aircraft design, there is a continual need to improve the effectiveness and/or efficiency of wing designs, thereby improving overall aircraft performance and/or fuel economy.

SUMMARY

Aspects of the present disclosure are directed toward wingtip feathers, including forward swept feathers, and associated aircraft systems and methods. An aircraft system in accordance with a particular embodiment includes an aircraft wing having an inboard portion and an outboard portion, with the wing further having a leading edge with an aft wing sweep angle (relative to the wing pitch axis) at the outboard portion. The system can further include a first feather fixed relative to and projecting outwardly from the outboard portion of the wing. The first feather can have a leading edge with a first, forward sweep angle relative to the pitch axis. The system can further include a second feather fixed relative to, and projecting outwardly from, the outboard portion of the wing. The second feather can be aft of the first feather and can have leading edge with a second, aft sweep angle relative to the pitch axis.

In further particular embodiments, the first feather can be canted upwardly relative to the pitch axis by an angle of up to about 20°, and the second feather can be canted downwardly relative to the pitch axis by an angle of up to about 20°. The first feather can have a forward swept trailing edge and the second feather can have an aft swept trailing edge. In still further particular embodiments, each of the first and second feathers can be fixedly attached to a base and can have a fixed position relative to each other, with the base fixedly attached to the outboard portion of the wing.

A method in accordance with another aspect of the present disclosure is directed to retrofitting an aircraft. The method can include removing a winglet from an outboard edge of an aircraft wing and, in place of the winglet, attaching to the wing first and second feathers projecting outwardly from the outboard edge of the wing. In a particular aspect of this method, the first feather can be swept forward relative to a pitch axis of the aircraft from which the wing depends, and the second feather can be swept aft relative to the pitch axis of the aircraft.

Still a further aspect is directed to a method for designing an aircraft system and includes determining a loading on a wing at multiple flight conditions. The method can further include determining a configuration and position of first and second wing feathers positioned at an outboard edge of the wing so that the first feather has a forward sweep and is loaded by a first amount at a first flight condition, while the second feather has an aft sweep and is unloaded or is loaded by a second amount less than the first amount. In addition, the second feather can be loaded by a third amount at a second flight condition different than the first flight condition, while the first feather is unloaded or is loaded by a fourth amount less than the third amount.

In further particular aspects, determining the configuration and position of the first and second wing feathers includes determining the configuration and position of the first feather to place a pitch-up moment on the wing at the first flight condition, and determining the configuration and position of the second feather to place a pitch-down moment on the wing at the second flight condition. In still a further particular embodiment, the first flight condition is a cruise flight condition at which the wing is under a first load, and the second flight condition is a maneuver condition at which the wing is under a second load higher than the first load.

DETAILED DESCRIPTION

The following description is directed generally to tip feathers, including forward swept tip feathers, and associated aircraft systems and methods. Several of the details describing structures and/or processes that are well-known and often associated with aspects of the systems and methods are not set forth in the following description for purposes of brevity. Moreover, although the following disclosure sets forth several embodiments of representative aspects of the invention, several other embodiments can have different configurations or different components than those described in this section. For example, other embodiments may have additional elements and/or may delete several of the elements described below with reference to FIGS. 2-6.

Figure 2:
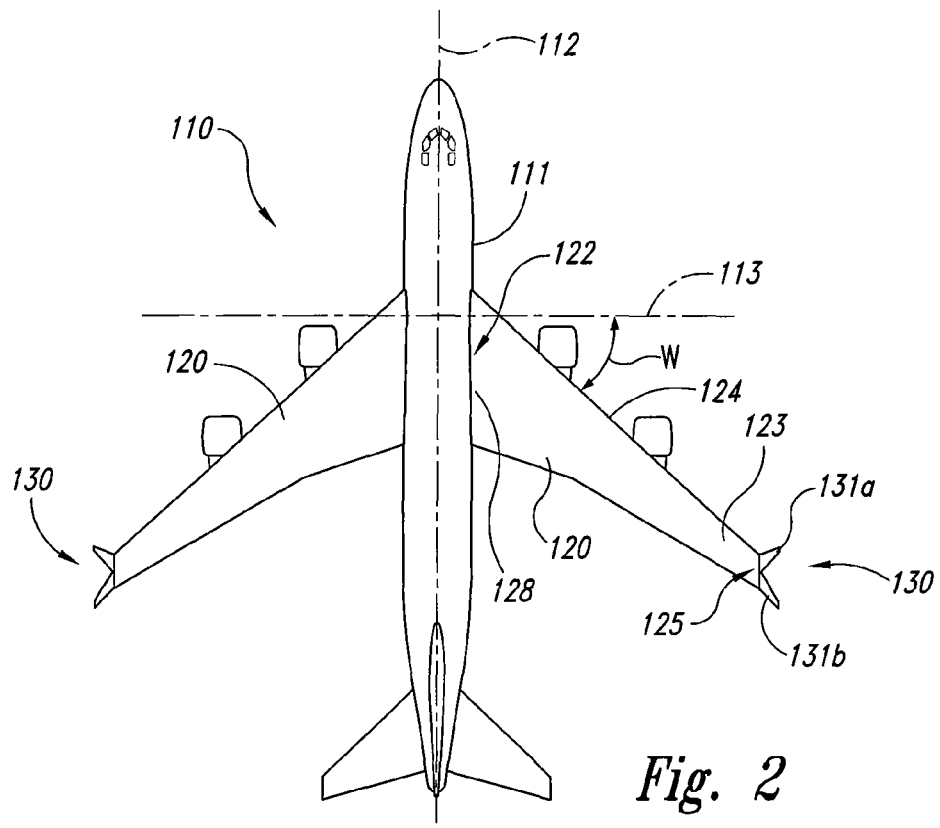
FIG. 2 is a top plan view of an aircraft having wing tip devices that include two feathers in accordance with a particular embodiment of the disclosure.

FIG. 2 is a top plan view of an aircraft 110 having tip devices 130 configured in accordance with a particular embodiment. The aircraft 110 includes a fuselage 111 elongated along a body axis 112, and wings 120 extending outwardly from the fuselage 111. The aircraft 110 and the wings 120 can pitch relative to a pitch axis 113. Because the aircraft 110 is designed for high subsonic and/or transonic flight, each wing 120 includes a leading edge 124 that is swept aft relative to the pitch axis 113 by a wing sweep angle W.

The wing 120 includes an inboard portion 122 attached to the fuselage 111, and an outboard portion 123 positioned outboard from the fuselage 111. The inboard portion 123 includes a wing root 128, and the outboard portion 123 includes a wing tip 125. The tip device 130 is positioned at the wing tip 125 and, in a particular embodiment, includes two feathers 131, illustrated as a first or forward feather 131a, and a second or aft feather 131b. As used herein, the term "feather" refers generally to a device that extends outwardly from a wing tip and has a chordwise dimension that is less than the chordwise dimension of the wing tip. Unlike typical winglets, feathers are positioned generally in the plane of the wing, or are canted upwardly or downwardly from the plane of the wing by a relatively small amount (e.g., ±45°). Further details of representative cant angles for the wing feathers in particular embodiments are described below with reference to FIG. 4.

Figure 3:
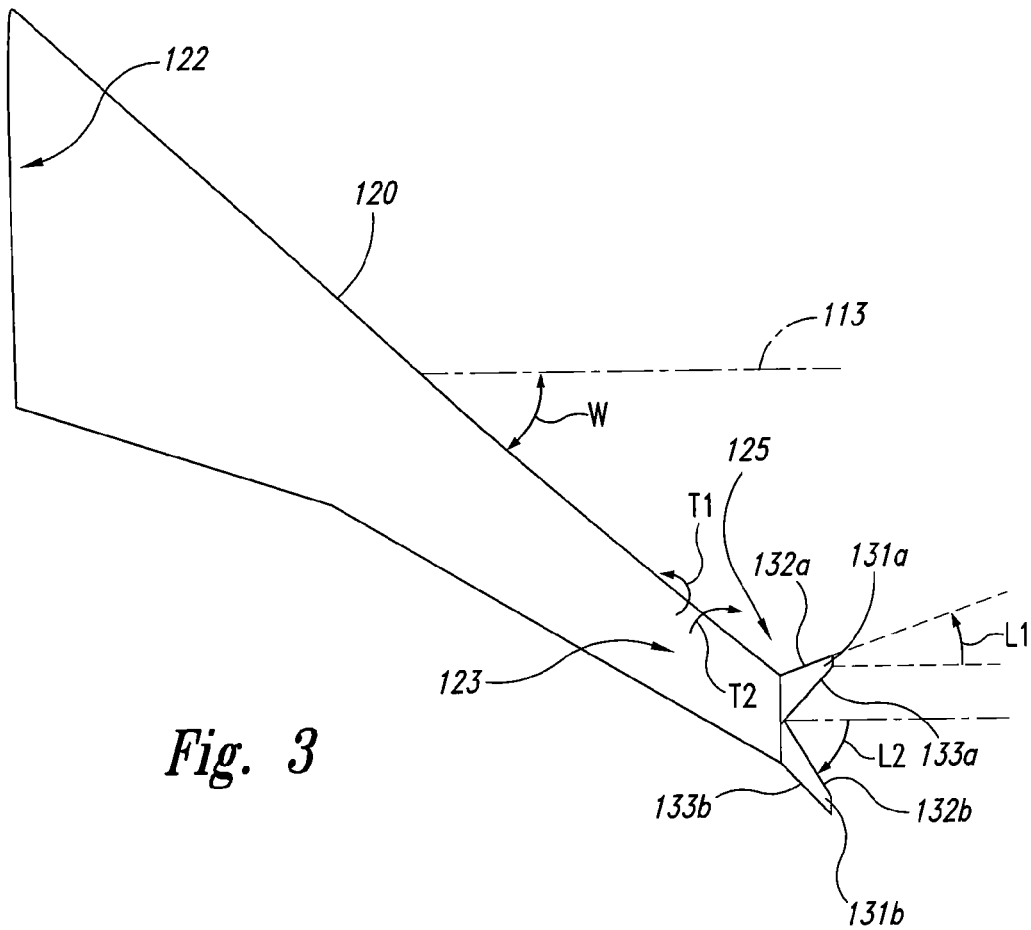
FIG. 3 is an enlarged view of one of the wings and tip devices shown in FIG. 2.

FIG. 3 is an enlarged view of the wing 120 described above with reference to FIG. 2. As is shown in FIG. 3, the first tip feather 131a has a first leading edge 132a that is swept forward by an angle L1 relative to the wing pitch axis 113. The second tip feather 131b has a second leading edge 132b that is swept aft relative to the wing pitch axis 113 by an angle L2. The first tip feather 131a can include a first, forward swept trailing edge 133a, and the second tip feather 131b can include a second, aft swept trailing edge 133b. In a particular aspect of this embodiment, both the first and second tip feathers 131a, 131b are installed so as to be fixed relative to the rest of the wing 120, and do not move relative to the wing 120 during operation.

Figure 1:
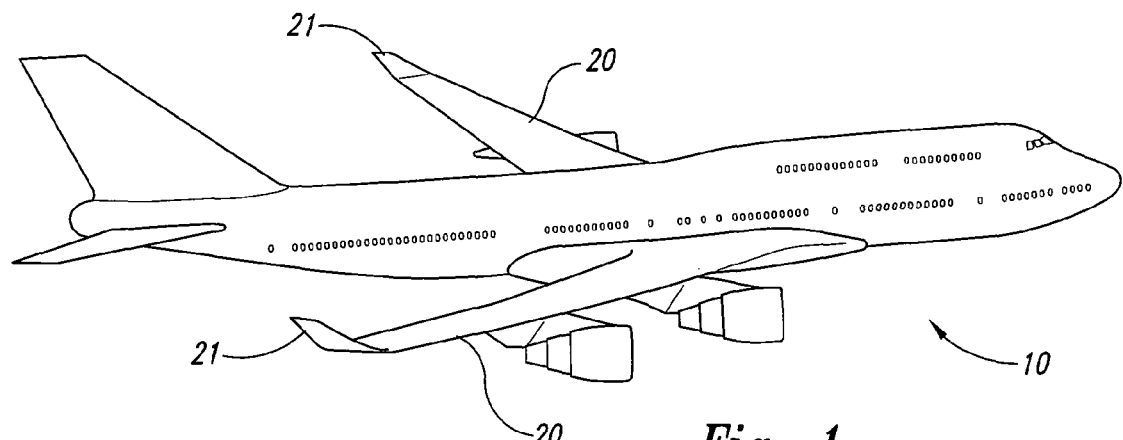
FIG. 1 is an illustration of an aircraft having winglets in accordance with the prior art.

The arrangement of the first and second tip feathers 131a, 131b can have significant advantages when compared to existing tip devices. For example, in at least some instances, the wing 120 is relatively flexible, and can accordingly twist when placed under load. As a result, at least some existing wing tip devices (e.g., the winglet 21 shown in FIG. 1) may not have the full desired impact on the wing loading distribution. In particular, when such devices are placed on the wing to increase wing loading at the wing tip, the increased loading can cause the wing tip to twist in a manner that reduces the wing angle of attack. This in turn reduces the loading that the existing wing tip device is intended to increase.

The first and second feathers 131a, 131b are expected to at least mitigate the foregoing effect. For example, because the first tip feather 131a has a forward swept first leading edge 132a, it is expected to be highly loaded during cruise flight conditions (e.g., constant speed, level flight). The position of the first feather 131a toward the forward portion of the wing tip 125 reduces the likelihood that the added lift will twist the wing tip 125 downwardly. Instead, it is expected that the first feather 131a will twist the leading edge of the wing tip 125 upwardly (as indicated by arrow T1) which increases, rather than decreases, the loading at the wing tip 125. This is a desirable condition at cruise because it increases span loading and therefore increases the efficiency of the wing 120. However, at other critical flight conditions (e.g., at high angle of attack or other maneuver conditions, including conditions that place a 2.5 g load on the wing 120), the increased loading at the wing tip 125 may not be desirable. For example, at such conditions, the increased loading at the wing tip 125 may place a higher than desired bending moment on the wing 120 at the inboard portion 122. Accordingly, the first feather 131a can be configured to stall at such flight conditions. In particular, if the aircraft is at a high angle of attack when it encounters a 2.5 g or other critical or high load condition, the forward sweep of the first leading edge 132a can cause the first feather 131a to aerodynamically stall, thereby unloading the wing tip 125.

The second feather 131b can, in at least one aspect of this embodiment, operate in an opposite sense from the first tip feather 131a. For example, the second tip feather 131b can be generally ineffective during cruise flight conditions, and can have a beneficial aerodynamic effect at high load or other critical conditions. In a particular embodiment, the second tip feather 131b can be positioned in the downwash of the first tip feather 131a so that it does not provide a significant amount of lift or lift enhancement during cruise flight. When the first tip feather 131a stalls (e.g., at high load conditions), the second tip feather 131b can become aerodynamically effective. Because the second tip feather 131b is positioned aft, and because the second leading edge 132b is swept aft, the effect of the second tip feather 131b is expected to allow, and in some cases, add to the tendency of the wing tip 125 to twist downwardly, as indicated by arrow T2. By twisting the leading edge of the wing tip 125 downwardly, the effective angle of attack of the wing tip 125 is decreased, which can further unload the wing tip 125 and reduce the bending moments at the inboard portion 122 of the wing 120. This arrangement can also delay the aerodynamic stall of the wing tip 125, thus preserving the lift capability of the wing tip 125 at high load conditions.

Figure 4:
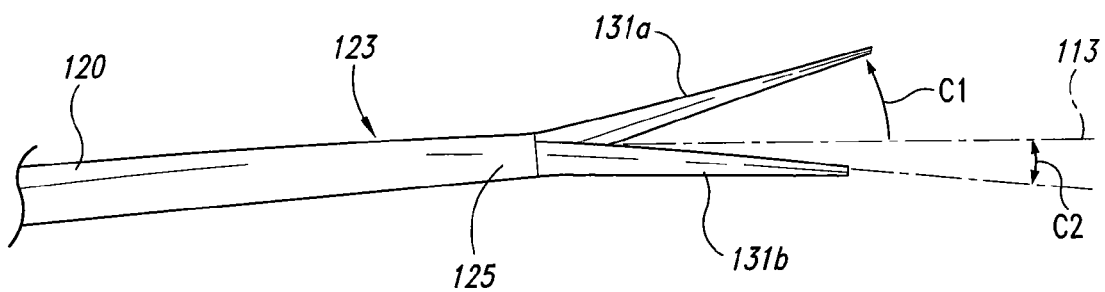
FIG. 4 is a rear elevation view of an embodiment of the tip device shown in FIG. 3.

FIG. 4 is a rear elevation view of the outboard portion 123 of the wing 120, illustrating the first feather 131a and the second feather 131b. In a particular aspect of an embodiment shown in FIG. 4, the first feather 131a is canted upwardly relative to the pitch axis 113 by a cant angle C1. The second feather 131b is canted downwardly relative to the pitch axis 113 by a second cant angle C2. The first and second cant angles C1, C2 can have a value generally less than 45° and in a particular embodiment, less than about 20°. The cant angles C1, C2 can be measured relative to the (generally horizontal) wing pitch axis 113, or relative to the local plane of the wing 120 at the wing tip 125, which may itself be canted upwardly (or downwardly) relative to the pitch axis 113. As discussed previously, these angular cant angle ranges are less than typical corresponding cant angles for winglets.

Figure 5A:
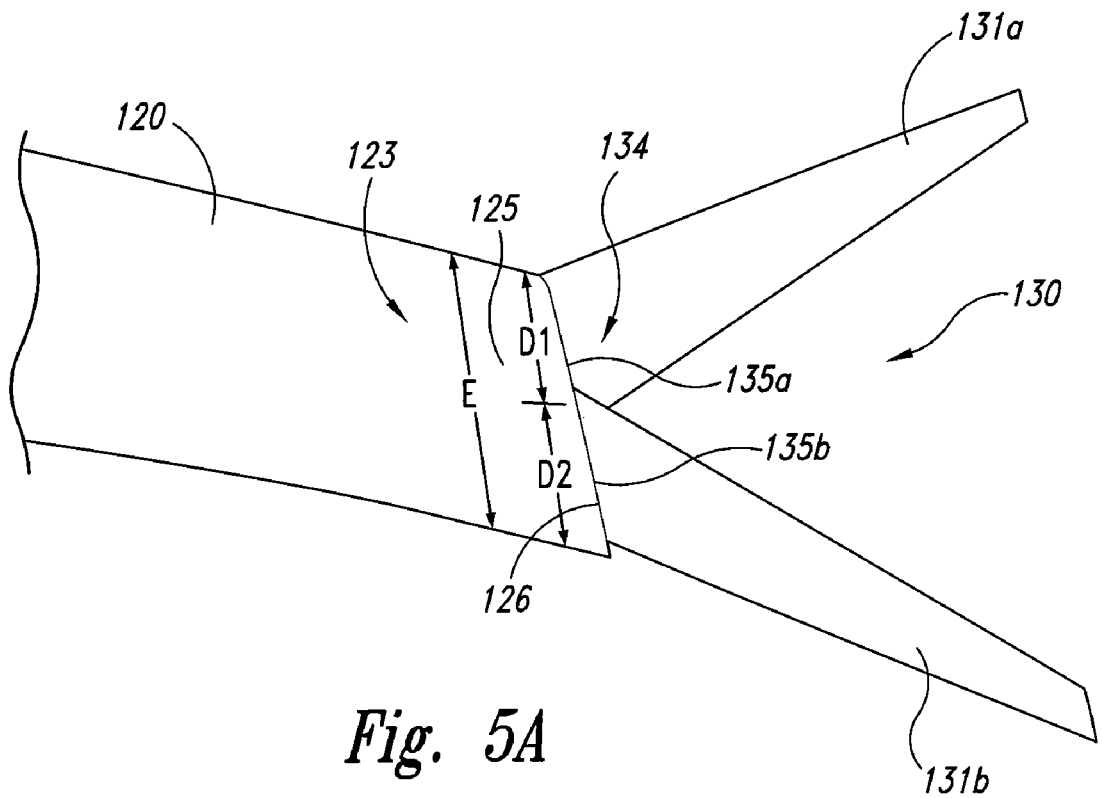
FIG. 5A is an isometric illustration of an embodiment of the tip device shown in FIG. 4.

FIG. 5A is an enlarged isometric illustration of the outboard portion 123 of the wing 120, illustrating an arrangement in which the first feather 131a and the second feather 131b are connected at a base region 134. Accordingly, the first and second feathers 131a, 131b have a fixed relationship relative to each other and relative to the base region 134. When the base region 134 is attached to the wing 120, e.g., at an outboard spar 126, the first and second feathers 131a, 131b have a fixed relationship relative to the wing 120 as well. An expected advantage of the fixed relationship of the first and second feathers 131a, 131b is that the relative positions of the tip feathers 131a, 131b will be maintained at all flight conditions. This in turn preserves the ability of the tip feathers 131a, 131b to operate in the manner described above with reference to FIG. 2, without the need for the positions of the tip feathers 131a, 131b to be adjusted. This is unlike some existing tip feather arrangements in which the tip feathers move relative to the wing, which may allow the tip feathers to be placed in a position that is unsuitable and/or inefficient for a particular flight regime in which the aircraft is operating.

In a particular aspect of an embodiment shown in FIG. 5A, each of the first and second tip feathers 131a, 131b can have a corresponding root chord dimension D1, D2 that is approximately half the root chord dimension E of the wing tip 125. In a further aspect of this embodiment, roots 135a, 135b of the corresponding first and second feathers 131a, 131b can overlap at the base region 134. In another embodiment, the tip feathers 131a, 131b can have smaller root chord dimensions D1, D2, and the roots 135a, 135b of the tip feathers 131a, 131b can be spaced apart. The particular arrangement of the first and second feathers 131a, 131b can depend upon the particular wing to which the tip device 130 is attached.

In general, it is expected that the forward sweep of the first tip feather 131a and the aft sweep of the second feather 131b will cause the tip device 130 to operate in the manner described above. Accordingly, when the tip feathers 131a, 131b are sized and configured, the process can be conducted such that the resulting first feather 131a is loaded by a first amount at a first flight condition (e.g., a cruise flight condition), while the second tip feather 131b is unloaded or is loaded by a second amount that is less than the first amount. For example, the second tip feather 131b can be located in the wake or downwash of the first feather 131a so as to be generally aerodynamically ineffective. Furthermore, the second tip feather 131b can be loaded by a third amount at a second (e.g., maneuver, high load and/or critical) flight condition different than the first flight condition, while the first feather 131a is unloaded, or is loaded by a fourth amount less than the third amount. For example, the first feather 131a can be stalled or partially stalled which the second feather 131b becomes aerodynamically effective and produces a lifting force, which in turn produces a torque on the wing 120. This foregoing process can be used in an iterative manner to modify the design of the wing 120 and/or the first and second tip feathers 131a, 131b.

Figure 5B:
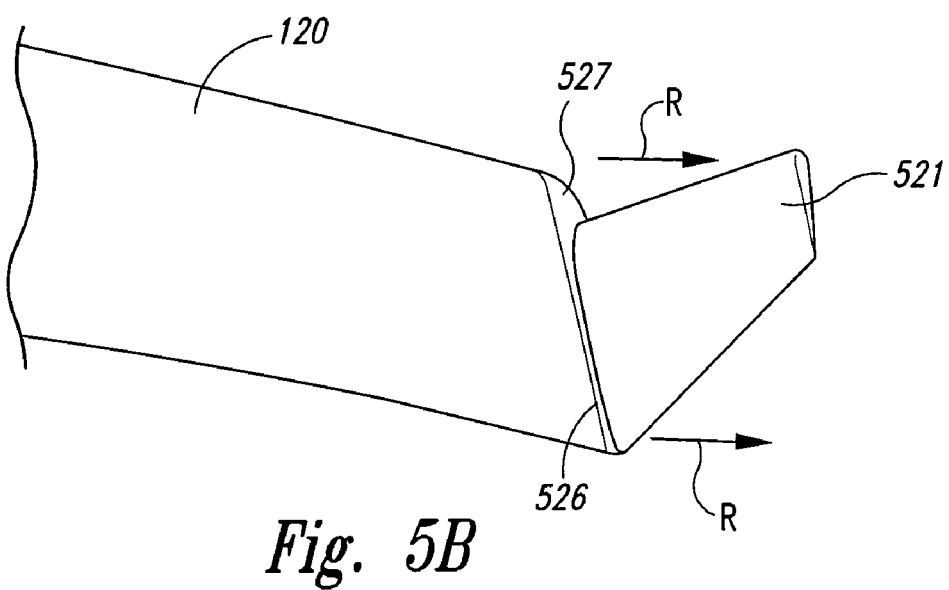
FIG. 5B is an illustration of the outboard portion of a wing having a winglet suitable for retrofitting with tip feathers in accordance with a particular embodiment.

In a particular embodiment, the foregoing process can be used to modify only the first and second tip feathers 131a, 131b, with the geometry of the wing 120 being fixed. FIG. 5B illustrates an arrangement where this approach is used to retrofit an existing wing 120 having an endcap 527 with a winglet 521. The endcap 527 is attached to the wing 120 at a spar 526, and can be removed, as indicated by arrows R, to expose the spar 526. The tip device 130 shown in FIG. 5A can then be attached to the wing 120 at the spar 526 to provide some or all of the flight benefits described above and summarized below.

One feature of particular embodiments of the foregoing methods and systems is that they can include applying a pair of tip feathers to a wing, with a forward one of the tip feathers having a forward swept leading edge, and an aft one of the tip feathers having an aft swept leading edge. In a particular arrangement, the sweeps of the leading edges are determined relative to the pitch axis of the wing and/or the aircraft to which the wing is attached. Though not limited to such embodiments, this arrangement can have particular benefits for highly flexible wings that experience a significant amount of twist under load. In particular, the forward swept first feather can reduce the tendency of the outboard wing portion to wash out and unload during cruise flight conditions, and can lose this effectiveness at high angles of attack. The second tip feather can have little or no effect at cruise conditions, thereby avoiding interference with the ability of the first tip feather to enhance wing tip loading. Instead, the second tip feather can at other (e.g., more severe), flight conditions increase the likelihood for the tip region to wash out, thus reducing bending moments and/or tip stall.

Another feature of at least some of the foregoing embodiments is that the first and second tip feathers are fixed relative to the wing. In addition to the expected benefits described above (e.g., greater assurance that the tip feathers are properly oriented and therefore performing as expected), this arrangement can reduce complexity and weight. Accordingly, this arrangement can improve overall aircraft performance. Another feature of at least some embodiments is that the first and second tip feathers need not include deployable variable geometry devices (e.g., leading edge slats and/or trailing edge flaps). This feature can also reduce aircraft weight and complexity, and therefore increase aircraft efficiency.

Yet another feature of at least some of the foregoing embodiments is that the tip devices include only two feathers. This arrangement can reduce weight and complexity when compared to other tip devices that include more than two tip feathers.

From the foregoing, it will be appreciated that specific embodiments have been described herein for purposes of illustration, but that various modifications may be included in other embodiments. For example, the first and second tip feathers may have different positions, locations, and/or configurations than are specifically illustrated in the Figures and described above, while still producing the effects described above. In a particular example the tip feathers may be canted by less than +20°, or more than ±45° (e.g., up to ±60°). The particular positions, locations, and configurations of the tip feathers may be adjusted depending upon the flight regime in which the aircraft flies and/or the particular characteristics of the wing to which the tip feathers are attached. Certain aspects described in the context of particular embodiments may be combined or eliminated in other embodiments. For example, methods of retrofitting existing wings with tip devices can include retrofitting with tip devices having different numbers and/or arrangements of feathers that are described in detail above. Further, while advantages associated with certain embodiments have been described in the context of those embodiments, other embodiments may also exhibit such advantages, and not all embodiments need necessarily exhibit such advantages. Accordingly, embodiments of the disclosure are not limited except as by the appended claims.

I claim:

1. An aircraft system, comprising:
   an aircraft wing having an inboard portion and an outboard portion, the wing further having a leading edge with a wing sweep angle at the outboard portion that is swept aft relative to a wing pitch axis;

a first feather fixedly installed relative to, and projecting outwardly from, the outboard portion of the wing, the first feather having a leading edge with a first sweep angle, the first sweep angle being a forward sweep angle relative to the pitch axis; and a second feather fixedly installed relative to, and projecting outwardly from, the outboard portion of the wing, the second feather being positioned at least partially aft of the first feather and having a leading edge with a second sweep angle, the second sweep angle being an aft sweep angle relative to the pitch axis.

2. The system of claim 1 wherein the first and second feathers are the only feathers carried by the wing at the outboard portion, and wherein first feather is canted upwardly relative to the pitch axis by an angle of up to about 20° and has a forward swept trailing edge, and wherein the second feather is canted downwardly relative to the pitch axis by an angle of up to about 20° and has an aft swept trailing edge, and wherein neither the first feather nor the second feather includes a deployable variable geometry device.

3. The system of claim 1 wherein the first feather has a forward swept trailing edge, and wherein the second feather has an aft swept trailing edge.

4. The system of claim 1 wherein the outboard portion of the wing is positioned in a wing plane, and wherein the first feather is canted upwardly relative to the wing plane, and wherein the second feather is canted downwardly relative to the wing plane.

5. The system of claim 1 wherein the first feather is canted upwardly relative to the pitch axis, and wherein the second feather is canted downwardly relative to the pitch axis.

6. The system of claim 5 wherein the first feather is canted upwardly by an angle of up to about 45°, and wherein the second feather is canted downwardly by an angle of up to about 45°.

7. The system of claim 5 wherein the first feather is canted upwardly by an angle of up to about 20°, and wherein the second feather is canted downwardly by an angle of up to about 20°.

8. The system of claim 1, further comprising a fuselage attached to the inboard portion of the wing, the fuselage being elongated along a body axis generally perpendicular to the wing pitch axis.

9. The system of claim 1 wherein the first feather and second feather are each fixedly attached to a base and have a fixed position relative to each other, and wherein the base is fixedly attached to the outboard portion of the wing.

10. The system of claim 1 wherein the first and second feathers are the only feathers depending from the outboard portion of the wing.

11. The system of claim 1 wherein neither the first feather nor the second feather includes a deployable variable geometry device.

12. The system of claim 1 wherein neither the first feather nor the second feather includes a deployable leading edge device.

13. The system of claim 1 wherein neither the first feather nor the second feather includes a deployable trailing edge device.

* * * * *